Aug. 27, 1957 R. THEILE 2,804,498

GAMMA CONTROL FOR FLYING SPOT SCANNER

Filed Oct. 12, 1951 2 Sheets-Sheet 1

Inventor
Richard Theile
By O'Boyle + Blair
Attorneys

Aug. 27, 1957 R. THEILE 2,804,498

GAMMA CONTROL FOR FLYING SPOT SCANNER

Filed Oct. 12, 1951 2 Sheets-Sheet 2

Inventor
Richard Theile
By O'Boyle & Blau
Attorneys 2,804,498

GAMMA CONTROL FOR FLYING SPOT SCANNER

Richard Theile, Cambridge, England, assignor to Pye Limited, Cambridge, England, a British company Application October 12, 1951, Serial No. 251,076

Claims priority, application Great Britain October 17, 1950

2 Claims. (Cl. 178—7.2)

Figure 1:
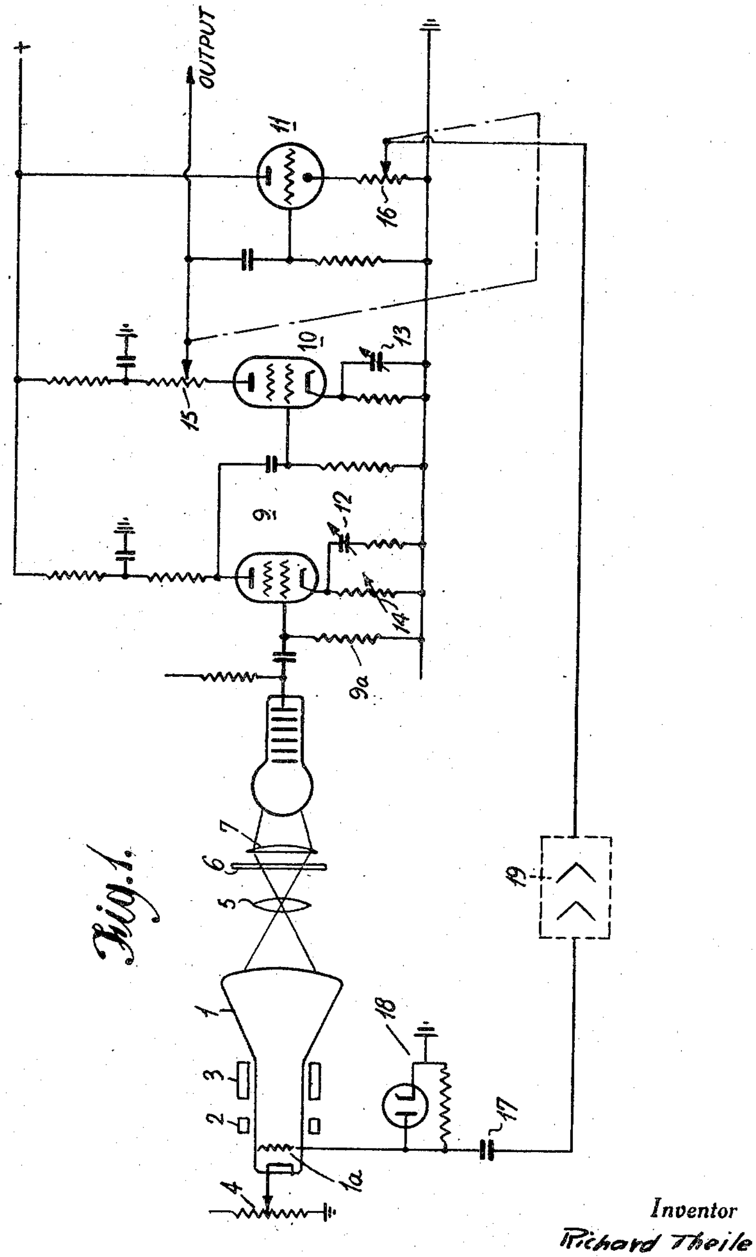

This invention relates to light spot scanning arrangements for picture transmission systems (including both television and picture telegraphy) in which a light spot is utilised for scanning the picture to be transmitted so as to evaluate the light tones thereof for illumination and light modulation of a suitable photoelectric pick-up tube from which is obtained a modulated picture signal which is fed to an amplifier for transmission in any known or suitable manner. Light spot scanning arrangements may be adapted to produce a moving or flying light spot for scanning the picture to be transmitted. The flying spot may be produced in various ways, e. g., by mechanical means, but more conveniently by means of a conventional form of cathode ray tube in which a fluorescent screen is scanned with an electron beam and the raster produced on the screen is focussed upon the picture to be scanned. For the transmission of picture transparencies, e. g., for televising cinematographic films, the flying spot is projected through the transparency and on to the pick-up tube. In the case of an opaque picture, the light reflected thereby is picked up by the pick-up tube. Light spot scanning arrangements may also be of a mechanical type, more particularly useful for picture telegraphy, in which the light spot is stationary and the picture is rotated so as to be scanned by the spot.

It is well known that in every picture transmission system in which the transmitter works for normal cathode ray tubes at the receiving end of the system, the transmitter should have a non-linear picture signal amplitude/light characteristic showing a levelling-off of amplitude at high light levels, in order to produce acceptable half-tone rendition in the picture reproduced by a cathode ray tube receiver. In television, pick-up tubes of the iconoscope and image iconoscope types, for example, possess this kind of characteristic and are therefore excellent in half-tone rendition. Light spot scanners, however, do not possess this kind of characteristic when operated with a spot of constant brightness, which is the operating condition accepted as normal for such devices. Therefore, when light spot scanners are working for cathode ray tube receivers it is necessary to change the "gamma" (i.e., the transmission amplitude characteristic) of the generated picture signal before transmission. Consequently, light spot scanners operating with constant spot brightness need a suitable "de-gamma" characteristic in the amplifying arrangement through which the picture signal is passed before transmission.

However, experience has shown that better results can be obtained if a transmitter possesses the required kind of signal amplitude/light characteristic inherent in the picture signal generation itself than if some form of correction in an endeavour to impart such a characteristic is introduced into the signal amplifying arrangement.

Therefore, in systems for televising films and incorporating a cathode ray tube for supplying the flying spot for scanning, a photo-electric pick-up cell energized by the luminous spot projected through the film and an amplifier for amplifying the resultant photo-electric current, it has previously been proposed to feed back a fraction of the amplified current to a modulating element of the cathode ray tube thereby to vary instant by instant the brilliance of the cathode ray spot to adapt its value to the transmission characteristic of the film.

The invention relates more specifically to light-spot scanning systems incorporating negative feedback to a modulating electrode of the cathode tube and according thereto there are provided control means for varying the amount of feedback, thus providing control of "gamma," and control means for controlling the gain of the picture signal amplifier, the two control means being combined or ganged together so that adjustment of the "gamma" automatically adjusts the gain of the picture signal amplifier in the required sense.

This ensures that there is adequate precompensation for screen afterglow effects.

In one embodiment according to the invention, the pick-up tube (photocell with or without a secondary electron multiplier) of a light spot scanning arrangement is connected through a load resistor to feed into a first amplifier, the output of which is fed into a second amplifier. A negative feedback loop feeds back a portion of the first amplifier output to the light spot source, if necessary through a phase converter in the loop. In the feedback loop is connected a device for adjusting the feedback ratio. If $e_0$ is the output voltage of the first amplifier, G is the overall gain of the pick-up tube, load resistor, first amplifier and spot brightness, expressed as a voltage output for a standard light input, T is the light transmission or reflection characteristic of the picture to be transmitted, and $\alpha$ is the negative feedback ratio, i. e. the ratio of voltage fed back to the output voltage of the amplifier, it can be shown that $$e_o=\frac{GT}{1+\alpha GT}$$

If $\alpha$ is small, $e_0$ is proportional to T, but if $\alpha$ increases, the relation between $e_0$ and T becomes more and more non-linear in the required sense, levelling off the highlights. Thus, control of the feedback ratio ($\alpha$) by means of the control device provided for that purpose gives the required kind of "gamma" control. This control device is combined with a gain control device provided within or external to the feedback loop so as to keep the peak-to-peak amplitude range substantially constant at the output of the second amplifier, as earlier mentioned.

The light spot source may be of any kind capable of being controlled as described. For example, it may consist of a normal form of cathode ray tube, the feedback loop being connected to one of the electrodes of the tube, such as the cathode or control grid, which controls the intensity of the scanning beam.

In addition to effecting control of "gamma," negative feedback of a portion of the output of the picture-signal amplifier can also automatically compensate for streaking effects due to the decay time of the afterglow of the fluorescent screen material. However, rather more feedback is required for this correction than for gamma control and therefore, if desired, means may be provided for obtaining a suitable, and preferably adjustable, amplitude/frequency characteristic in the feedback system for pre-compensating for the screen afterglow effects. Such means may comprise, in the feedback system, an amplifier (such as the first amplifier in the above-described embodiment) or a network having a suitable adjustable frequency response such as substantially to compensate screen afterglow effects. By taking care of the screen afterglow compensation primarily by such means provided expressly for that purpose, the feedback, may then be utilised primarily for "gamma" correction and be applied in the required limited degree for that purpose.

Accordingly, so far as screen afterglow compensation is concerned, the feedback then serves only to correct the tolerances in adjustment of the amplitude/frequency characteristic of the afterglow-compensation means provided in the feedback system, or to improve the accuracy of the afterglow compensation, and also to reduce the effect of change in afterglow characteristic with scanning beam current density.

However, a higher degree of feedback may be provided, if desired, for instance, for obtaining greater stability in operation or for obtaining a greater degree of automatic afterglow compensation. In that case, since the degree of feedback employed will be more than sufficient for "gamma" correction, further "gamma" correcting means must therefore be provided to compensate for this in the subsequent circuit, outside the feedback system, through which the picture signal is passed for transmission, or in the particular case of a transmitter and receiver working on a closed circuit, such further "gamma" correcting means could, of course, be provided at the receiver. An advantage of this mode of operation with more feedback than is required for "gamma" correction is that less accuracy is required in adjustment of the amplitude/frequency characteristic of the afterglow-compensation means provided in the feedback system.

Figure 2:
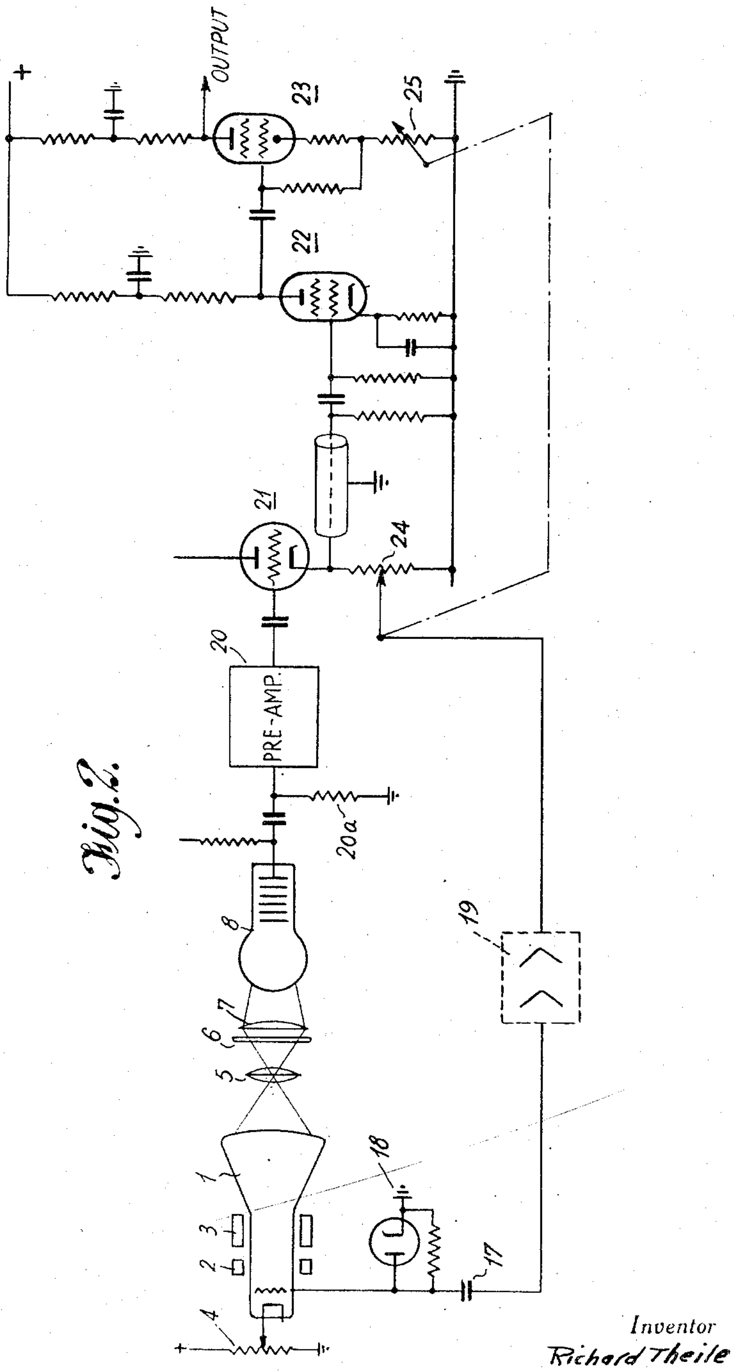

In order that the invention may be more readily understood, reference will now be made to the accompanying drawings which show two schematic circuit arrangements thereof by way of non-limiting example and in which:

Fig. 1 shows an arrangement incorporating gamma and gain control within the feedback loop, and Fig. 2 shows an arrangement in which the gain control is effected outside the feedback loop.

In Fig. 1 a circuit arrangement is shown which incorporates combined "gamma" and "gain" control within the feed-back loop. A light-spot scanning arrangement is shown at 1 comprising a cathode ray tube and conventional focussing and deflecting coils 2 and 3. A brightness control is also incorporated as shown at 4. The arrangement is such as to produce a light spot which effects either a single line scan in a horizontal direction or a complete frame scan as desired. In televising a single still transparency, the scanning spot will be arranged to scan a complete frame but in the case of a cinematograph film which is continuously moving, the scanning spot need only scan in a horizontal line. As shown, the light spot is focussed by means of the lens 5 on to the transparency 6 and a condenser lens 7 collects the variations in light intensity varying in dependence upon the tone values of the transparency 6, and passes these variations to a photoelectric cell pick-up tube 8 which preferably incorporates an electron multiplier as shown, although it is to be understood that it is not specifically essential to the working of the invention. The output from the pick-up tube 8 is connected through a load resistor 9*a* to feed into a first amplifier 9, the output from which is fed into a second amplifier comprising the two tube circuits 10 and 11. So far as the normal operation of the amplifier circuits 9, 10 and 11 are concerned, it need only be said that these amplifiers are conventional resistance-capacity-coupled amplifiers as shown and therefore it is not considered necessary to elaborate on the components and specific circuit arrangements thereof since they will follow normal conventional amplifier practice. In the cathode circuits of the tube arrangements 9 and 10 are provided variable capacitors 12 and 13 for screen afterglow correction. A variable resistor 14 is also included in the cathode circuit of tube arrangement 9 to act as a means of varying the bias thereto.

In order to keep the peak-to-peak amplitude of the picture signal amplified by the amplifying arrangements substantially constant, a potentiometer 15 is arranged in the anode circuit of the tube 10 and a portion of the picture signal is fed back negatively from the cathode circuit of the tube 11 by means of the potentiometer 16, the signal being fed back to the modulating grid 1*a* of the tube 1.

The two controls 15 and 16 are combined or ganged together by being mounted on a common operating spindle so that the gamma adjustment provided by the potentiometer 16 automatically adjusts the gain of the amplifier in the required sense.

A coupling condensing 17 is provided in the feedback loop together with a conventional D. C. restorer circuit 18. If desired, a constant-gain amplifier 19 may also be incorporated in the feedback loop.

Fig. 2 shows an embodiment of the invention in which the control of the signal gain is outside the feedback loop. In this figure components bearing like reference numerals to those in Fig. 1 perform the same or similar functions. In this figure, the output from the pick-up tube 8 is fed through a load resistor 20*a* to a pre-amplifier 20 of any conventional form and the output from this pre-amplifier is taken to amplifying circuit arrangements 21, 22 and 23.

In this particular case, the negative feedback is provided by means of the potentiometer 24 connected in the cathode circuit of the amplifying tube 21 and the gain of the signal amplifier as a whole is controlled by means of the potentiometer 25 connected in the cathode circuit of the tube 23. Again the controls 24 and 25 are combined or ganged together by being mounted on a common spindle to effect simultaneous control of gamma and gain.

Similarly to the arrangement shown in Fig. 1, a coupling condenser 17 is shown in the feedback loop together with a D. C. restorer circuit 18 and again, if desired, a constant-gain amplifier may be incorporated at 19.

In all arrangements according to this invention, means are provided for obtaining a suitable frequency cut-off in the feedback system in order to avoid positive feedback occurring which would give rise to instability.

What I claim is:

1. A light-spot scanning arrangement for picture-transmission systems, comprising light spot means for scanning the picture to be transmitted so as to evaluate the light tones thereof, a photo-electric pick-up tube located for illumination and light modulation by said evaluated light tones, thus to produce a picture signal, a picture-signal amplifier connected to said photo-electric pick-up tube, means for feeding back negatively a proportion of said picture signal from an appropriate stage of said amplifier to control said light spot means, control means for varying the amount of said negative feed-back, thus providing control of gamma, and further control means for controlling the gain of said picture-signal amplifier, said two control means being combined or ganged together so that adjustment of the gamma simultaneously controls the gain of the picture-signal amplifier in the required sense.

2. A light-spot scanning arrangement for picture transmission systems, comprising a cathode ray tube, means for producing a scanning light spot on the screen of said cathode ray tube, means for causing said scanning light spot to scan the picture to be transmitted and thereby evaluate the light tones thereof, a photoelectric pick-up tube located for illumination and light modulation by said evaluated light tones, thus to produce a picture signal, a picture-signal amplifier connected to said photoelectric pick-up tube, means for feeding back negatively a portion of the picture signal from an appropriate stage of said amplifier to a modulating electrode of said cathode ray tube, control means for varying the amount of feedback thus providing control of gamma, and further control means for controlling the gain of said picture-signal amplifier, said two control means being combined or ganged together so that adjustment of the gamma simultaneously adjusts the gain of the picture-signal amplifier in the required sense.

(References on following page)

References Cited in the file of this patent

UNITED STATES PATENTS

| | | |
|---|---|---|
| 2,188,679 | Dovaston et al. | Jan. 30, 1940 |
| 2,227,492 | Faudell et al. | Jan. 7, 1941 |
| 2,258,762 | Hickok | Oct. 14, 1941 |
| 2,480,423 | Simmon | Aug. 30, 1949 |
| 2,480,424 | Simmon | Aug. 30, 1949 |
| 2,480,425 | Simmon | Aug. 30, 1949 |
| 2,530,275 | Weingarten | Nov. 14, 1950 |

FOREIGN PATENTS

| | | |
|---|---|---|
| 435,749 | Great Britain | Sept. 26, 1935 |
| 483,935 | Great Britain | Apr. 28, 1938 |